United States Patent [19]
Koenig et al.

[11] Patent Number: 5,170,638
[45] Date of Patent: Dec. 15, 1992

[54] VARIABLE AREA REFRIGERANT EXPANSION DEVICE

[75] Inventors: Kenneth Koenig, East Syracuse, N.Y.; Wayne R. Reedy, Edwardsville, Ill.

[73] Assignee: Carrier Corporation, Syracuse, N.Y.

[21] Appl. No.: 473,481

[22] Filed: Feb. 1, 1990

[51] Int. Cl.⁵ .............................................. F25B 41/04
[52] U.S. Cl. ...................................... 62/204; 62/222; 62/528; 137/503; 137/504; 137/508
[58] Field of Search .................. 62/204, 205, 222, 528; 137/503, 504, 508, 517; 138/45

[56] References Cited

U.S. PATENT DOCUMENTS

| | | | |
|---|---|---|---|
| 780,986 | 1/1905 | Francis | 137/504 |
| 1,159,214 | 11/1915 | Gueux | 137/503 |
| 3,023,591 | 3/1962 | Tilney | 62/204 |
| 3,421,542 | 1/1969 | Adams et al. | 137/504 |
| 3,431,944 | 3/1969 | Sakuma | 137/504 X |
| 3,464,439 | 9/1969 | Budzich | 137/504 |
| 3,482,415 | 12/1969 | Trask | 62/222 |
| 3,992,898 | 11/1976 | Duell et al. | 138/45 X |
| 4,075,294 | 2/1978 | Saito et al. | 137/504 X |
| 4,437,493 | 3/1984 | Okuda et al. | 137/504 X |
| 4,932,435 | 6/1990 | Stroze et al. | 137/504 |

*Primary Examiner*—William E. Tapolcai

[57] ABSTRACT

A refrigerant flow metering device for use in a refrigeration system includes a body having a flow passage extending therethrough. A piston having a flow metering port extending therethrough is movably disposed within the flow passage. An elongated member extends into the metering port of the piston and cooperates with the port to define a flow metering passage therebetween. The elongated member is configured such that it will vary the cross-sectional area of the flow metering passage a function of the position of the member to the metering port. Means are provided for supporting the elongated member within the housing and for controlling the relative axial position of the elongated member and the piston with respect to one another as a function of the differential pressure across the piston. The refrigerant expansion device is capable of responding to certain pressure and flow conditions within a refrigeration system to provide optimum expansion areas within the device for such pressure and flow conditions.

23 Claims, 4 Drawing Sheets

VARIABLE AREA REFRIGERANT EXPANSION DEVICE

BACKGROUND OF THE INVENTION

1. Field of the Invention

This invention relates in general to fluid flow metering devices and in particular to refrigerant expansion devices used in compression refrigeration systems. More specifically, this invention relates to an expansion device that has a variable expansion area that is operated by the pressure differential existing between the high and low pressure sides of a refrigeration system.

2. Description of the Prior Art

A compression refrigeration system comprises a compressor, a condenser, an expansion device and an evaporator connected in a closed circuit to provide refrigeration. Hot compressed refrigerant vapor from the compressor enters the condenser, where it transfers heat to an external heat exchange medium and condenses. Condensed refrigerant, at a high pressure, flows through the expansion device, where the refrigerant undergoes a pressure drop and at least partially flashes to a vapor. The liquid-vapor mixture then flows through the evaporator where it evaporates and absorbs heat from the external surroundings. The low pressure refrigerant vapor then returns to the compressor to complete the circuit.

Although the expansion device is often of simple construction, its role in the refrigeration system is crucial. Ideally, the expansion device should meter refrigerant in a manner such that refrigerant leaving the evaporator is super-heated by a controlled, relatively small amount. The foregoing is desired to prevent any damaging liquid refrigerant from entering the compressor, and to avoid subjecting the compressor to excessive temperatures from highly super-heated vapor.

The performance of the expansion device plays an important role not only in protecting the compressor, but also in determining the cooling capacity of the refrigeration system. Since the system is a closed circuit, any effect the device has on the low or evaporator side is intimately tied in with the performance of the high or condenser side. Most conventional air conditioning systems incorporating compression refrigeration units of the kind described are designed to have a predetermined cooling capacity at a given ambient temperature. The capacity of the system usually decreases at ambient temperatures above the design point. The decrease in capacity of the system at temperatures above the design point has a direct effect on the requirements related to the type of expansion device.

Among the most commonly used expansion devices are thermostatic expansion valves, capillary tubes and other fixed orifice devices. Thermostatic expansion valves control the flow rate of liquid refrigerant entering the evaporator as a function of the temperature of the refrigerant gas leaving the evaporator. This control is achieved by varying the cross-sectional area through a needle type valve contained within the valve body. The needle is typically joined to a flexible metal bellows or diaphragm which is, in turn, actuated by a non-heat conducting rod connected at its other end to a sealed bellows. The sealed bellows, in turn, is joined to a thermostatic sensing bulb by means of a capillary tube. This bulb provides the feedback to the valve of the temperature of the refrigerant leaving the evaporator and the valve responds by increasing or decreasing the flow of refrigerant through the needle valve according to this temperature. While being highly efficient in their operation and readily responsive to changes in load upon the system to vary the flow of refrigerant to the evaporator, thermostatic expansion valves are also complicated and relatively expensive. Further, in split system type air conditioning systems, wherein the compressor and condenser are located outside at a remote location from the evaporator, the distance of the sensing bulb from the compressor result in less than optimum conditions in such systems.

Capillary tubes are generally used in place of thermostatic expansion valves, particularly in smaller applications, wherein ambient air is almost universally utilized as the condensing medium. Although capillary tubes are relatively inexpensive to manufacture and are simple to install, they have some serious operating limitations, particularly when they are operating at conditions above or below the design point of the system.

As an example, as the outdoor ambient temperature increases there is a large increase in the pressure differential across the expansion device. However, the pressure ratio across the compressor, and likewise the flow rate pumped by the compressor remain about the same. Because of the higher pressure, but the same flow rate, the amount of subcooling of the refrigerant entering the expansion device drops, which means that there is now less refrigerant residing in the high side of the system. To conserve total refrigerant in the system, it follows, that the evaporator must contain more refrigerant and this causes the superheat of the refrigerant leaving the evaporator to drop. As a result, at times, a portion of the refrigerant flow to the evaporator will not be evaporated and will remain in its liquid state as it passes from the evaporator to the compressor. The introduction of liquid refrigerant into the compressor may produce serious problems, such as breaking valves, in addition to a decrease of the efficiency of operation of the compressor.

An additional problem is found at relatively low ambient temperatures, wherein the pressure differential across the expansion device is of a relatively small magnitude. Under these conditions the subcooling of the refrigerant entering the expansion device increases as the outdoor ambient temperature falls, leading to more refrigerant being stored in the condenser, which starves the evaporator. As a result, more of the evaporator becomes filled with superheated vapor and the superheat leaving the evaporator increases. Using increased evaporator surface to superheat refrigerant is not putting the surface to its most effective use.

Another known fixed orifice expansion device is the orifice plate. Very simply, an orifice plate comprises a thin plate having an expansion orifice extending therethrough. Orifice plates are small and inexpensive, but they are erratic in performance. Hence, such plates are not in wide use.

In an attempt to provide an alternate expansion device, having the economical advantages of the capillary tube, while being smaller and more efficient in operation, the expansion device described in commonly assigned U.S. Pat. No. 3,642,030 entitled "Refrigerant Throttling Device" and issued on Feb. 15, 1972 in the name of Larry D. Amick was developed. That device comprises a body member having a tubular insert having prescribed length-to-bore diameter ratios, a conical inlet, and a conical exit.

Continuing efforts to develop an economical, efficient and effective fixed orifice expansion device resulted in the development of the expansion device described in commonly assigned U.S. Pat. No. 3,877,248 entitled "Refrigerant Expansion Device" which issued Mar. 1, 1974 in the name of Fred V. Honnold, Jr. That device comprises a body having an expansion conduit extending therethrough with a flat entrance presenting a sharp edge orifice to incoming refrigerant. The sharp edge entrance orifice effects a major portion of the refrigerant pressure drop at the entrance, so that only a short conduit length is necessary to effect the balance of the pressure drop demanded of the device. The body member is incorporated in a unitary coupling member configured to join refrigerant lines from the condenser to the evaporator.

Commonly assigned U.S. Pat. No. 3,992,898 entitled "Moveable Expansion Valve" which issued Nov. 23, 1976, in the name of Richard J. Duell and John A. Ferrel represents a further refinement of a fixed orifice expansion device. In the device of this patent, the refrigerant metering port is formed in a free floating piston which is mounted within a chamber. When refrigerant flows through this device in one direction, the free floating piston moves to one position wherein the refrigerant flow is through the metering port thereby serving as an expansion device. When refrigerant flows through this device in the opposite direction, the free floating piston moves to a second position wherein refrigerant is allowed to flow through a number of flow channels formed in the outer peripheral of the piston to thereby allow substantially unrestricted flow through the device. This arrangement allows such a device to be used, in combination with a second expansion device of the same design, in a heat pump system to allow the desired expansion of the refrigerant through the system flowing in both the cooling and heating directions.

In a cooling only system the expansion device of the '898 patent allows a system to be adjusted as to the amount of refrigerant superheat and other expansion parameters by changing the piston contained within the valve body in the field. The piston usually is changed to match the diameter of the metering port, running the length of the piston, with the requirements of a particular system to optimize performance.

U.S. Pat. No. 4,263,787, issued to the assignee hereof, entitled "Expansion Device with Adjustable Refrigerant Throttling" which issued Apr. 28, 1981 to Albert A. Domingorena relates to an improvement of the device of the '898 patent which allows adjusting the diameter of the metering port without having to break into the refrigeration circuit of the system to change the piston.

Summing up the state of the prior art, thermostatic expansion valves, while being highly efficient in their operation and readily responsive to changes in load upon the system to vary the flow of refrigerant to the evaporator, are complicated, expensive, and have drawbacks in certain applications. For this reason they are generally not employed in small applications. As a result, capillary tubes or other fixed orifice expansion devices are generally used in such small applications. Such devices are relatively inexpensive, however, as discussed above, they have operating limitations at both high and low ambient temperatures.

From the foregoing, it is evident that the need exists for a refrigerant expansion device which is inexpensive to manufacture and which is effective in performance over a wide range of operating conditions.

One approach to solving this problem has been to design a refrigerant flow metering device which has a flow metering passage which varies in cross-section in response to changes between the high and low side pressures in the refrigeration system. One such device is described in commonly assigned U.S. Pat. No. 3,659,433 entitled "Refrigeration System Including a Flow Metering Device" issued on May 2, 1972 in the name of David N. Shaw.

It is well known by refrigeration design engineers that, for every operating condition of a refrigeration system, there are optimum values of certain parameters, (e.g., subcooling and superheat), that can maximize performance of any given system. It is also well known that, for a given refrigeration system, operating at given conditions, the design tools are available, i.e., through analysis or through use of a design program, to determine the optimum expansion area in an expansion device that will result in such optimum parameters.

A refrigerant expansion device that is capable of responding to certain pressure and flow conditions to provide such optimum expansion areas within the device for such pressure and flow conditions is deemed to be desirable.

SUMMARY OF THE INVENTION

An object of the present invention is to meter the flow of fluid in a tube or pipe in response to the pressure and flow conditions of the fluid.

A further object of the invention is to control the flow of refrigerant in a refrigeration system in response to the operating conditions of the system.

It is another object of the invention to control the flow of refrigerant through an expansion device at an optimum flow rate regardless of the operating conditions.

It is yet a further object of the present invention to control the flow of refrigerant through a refrigeration system at an optimum level over a broad range of system operating parameters.

It is another object of the present invention to provide an expansion device wherein the cross-sectional area of the flow metering passage is controlled to an optimum size for every operating condition of the system.

It is yet another object of the invention to reduce the migration of liquid refrigerant from the condenser to the evaporator when a refrigeration system is shut off.

It is a related object of the present invention to achieve these and other objects with a simple, safe, economical and reliable expansion device.

These and other objects of the present invention are achieved by a fluid flow metering device which has a housing with a flow passage extending therethrough. Mounted within the housing is a piston having a flow metering port extending axially therethrough. The piston is mounted such that it is moveable within the flow passage. An elongated member is also provided within the housing and extends into the metering port of the piston. The elongated member and the metering port cooperate to define a flow metering passage between them. The elongated member is configured such that the cross-sectional area of the flow metering passage varies in relation to the position of the elongated member to the flow metering port. Means are provided for supporting the elongated member within the housing and for controlling the axial position of the elongated member and the piston with respect to one another as a function of the differential pressure across the flow metering piston.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DESCRIPTION OF THE PREFERRED EMBODIMENT

Figure 1:
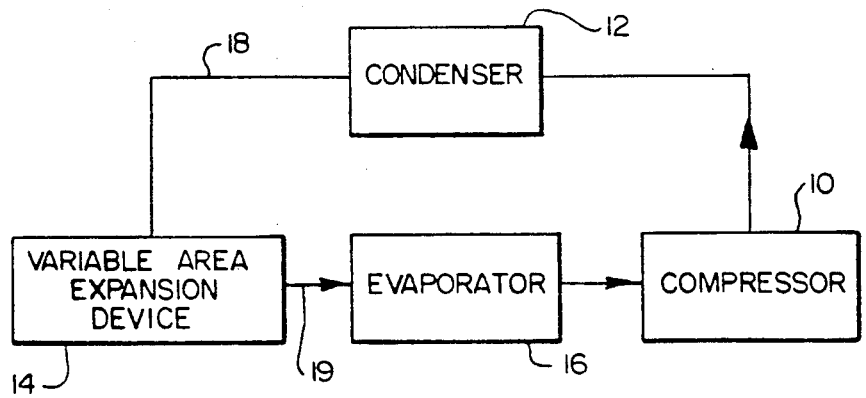
FIG. 1 is a diagram of a compression refrigeration system making use of an expansion device according to the present invention.
Figure 2:
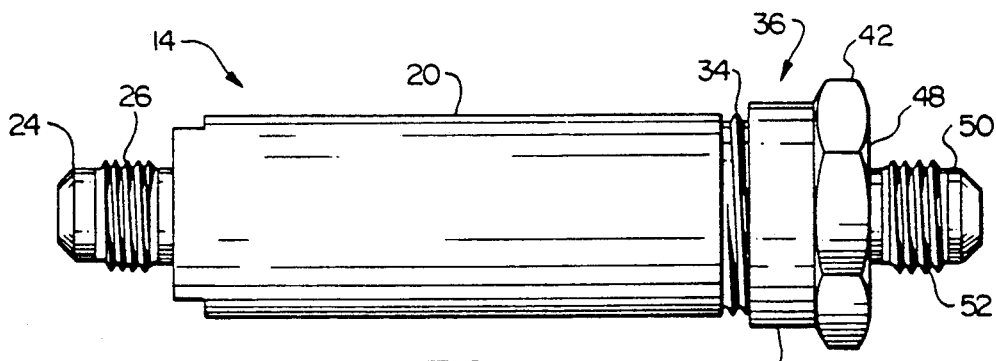
FIG. 2 is a side elevational view of a variable area expansion device that is made in accordance with the principals and teachings of the present invention.

Referring now to the drawings, there is depicted in FIG. 1 a compression refrigeration system which includes a compressor 10, a condenser 12, a refrigerant expansion device in the form of a variable area expansion device 14 and an evaporator 16. These components are connected by refrigerant lines to form a refrigeration circuit. In operation, the compressor 10 compresses refrigerant vapor and the vapor flows to condenser 12. The hot, compressed vapor gives off heat in the condenser 12 and condenses to form a high pressure liquid refrigerant which then flows through a high side refrigerant line 18 to the expansion device 14. Expanded refrigerant is discharged from the expansion device 14 through a low side refrigerant line 19 which leads to the evaporator 16. The refrigerant in the evaporator 16 absorbs heat from an external heat exchange medium and vaporizes, and the low pressure refrigerant vapor proceeds back to the compressor 10.

The compression refrigeration system thus described is typical of that found in many air conditioning applications and it should be understood it is applicable to numerous other refrigeration applications. The terms high side and low side used in the above description are common terms used in the discussion of compression refrigeration systems. The compressor outlet and the inlet to the refrigeration expansion device 14 define the high pressure side of the refrigeration system, and the refrigerant expansion device outlet and the compressor inlet define the low pressure side of the system. The difference in the pressure between the high and the low sides of the system is directly related to the load or demand on the refrigeration system and the outdoor ambient temperature as was described above. As will become more apparent hereinafter, the variable area expansion device of the present invention uses such pressure differential at all operating conditions of the system to provide an optimum expansion area for all such operating conditions.

The expansion device 14 is a self contained, mechanical device having a variable orifice arrangement whose size is varied to control the flow of refrigerant through the device and to the evaporator of the compression refrigeration system in which it is used to maintain a predetermined amount of superheat of refrigerant leaving the evaporator or entering the compressor. The orifice varying mechanism operates in response to the pressure differential which exists between the high and low side of the air conditioning system in which it is used.

Figure 8:
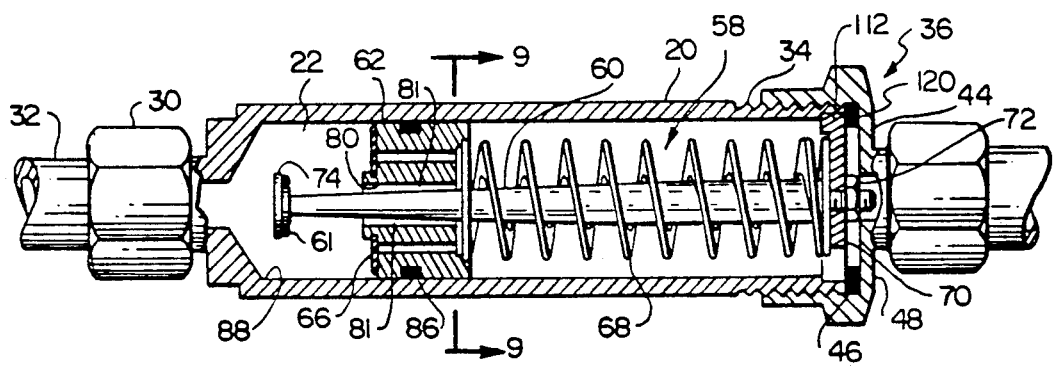
FIG. 8 is a longitudinal sectional view of the expansion device of FIG. 1 with refrigerant lines operably connected thereto and showing operation of the device during the cooling mode of operation.

Looking now to FIGS. 2 thru 4, 8, 9, and 11, it will be seen that the expansion device comprises a generally cylindrical body 20 which defines a cylindrical elongated chamber 22 in the interior thereof. Extending from the left hand end of the body 20, as viewed in the drawing figures, is a reduced diameter nipple 24 having a male thread 26 formed on the exterior thereof and having a fluid passageway 28 formed therein which communicates the interior chamber 22 with the exterior thereof. The male thread 26 is adapted to mate with a female connector 30 associated with the high side refrigerant line 18 to create a fluid tight joint therebetween, as shown in FIG. 8.

The right hand end of the body 20 is open ended and has a male thread 34 formed on the exterior surface thereof. The open end of the body 20 is closed by an end cap 36 which includes a cylindrical section 38 which has threads 40 formed therein, which mate with the threads 34 on the exterior of the body 20.

The end cap 36 further includes a hexagonally shaped wrench receiving surface 42 formed on the exterior thereof and includes an end wall 44. The end wall 44 defines an inner planar surface 46 which defines the right hand end of the chamber 22 and an outer planar surface 48 from which a reduced diameter nipple 50 extends. The nipple 50 is substantially identical to that formed on the left hand end of the housing and includes a male threaded section 52 formed on the exterior thereof and a fluid passageway 54 extending therethrough which communicates with the chamber 22. The passageway 54, the chamber 22, and the passageway 28 in the nipple 24 together define a flow passage through the expansion device.

A circular washer 56 is mounted within the end cap 36 in contact with the inner planar surface 46. The washer 56 cooperates with the right hand end of the expansion device body 20 to establish a fluid tight seal between the body 20 and the end cap 36.

A refrigerant metering subassembly 58 is mounted within the elongated chamber 22 of the body 20. As will be understood as the description of the device continues, several components of the refrigerant metering subassembly 58 are selected according to the particular application to which the expansion device is to be used. Further, the subassembly 58 is assembled and properly adjusted for such particular application prior to being inserted within the body and the end cap 36 being assembled to the body. The elements which make up the refrigerant metering subassembly 58 will first be identified and then the interaction between these elements will be described. A more detailed description of the specific configuration of these elements will follow in connection with the operation of the device. The refrigerant metering subassembly includes a metering rod 60, a metering rod seal 61, a refrigerant metering piston 62, a refrigerant metering piston o-ring 64, a refrigerant metering piston bypass seal 66, a refrigerant metering spring 68, a refrigerant metering spring retainer 70, and finally, a metering assembly lock nut 72.

Figure 5:
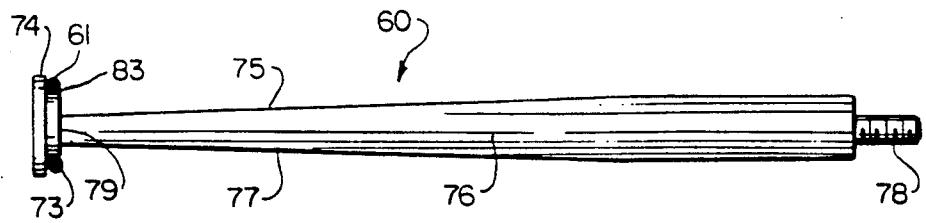
FIG. 5 is an enlarged longitudinal view of the metering rod of the expansion device of FIG. 1.

As best seen in FIG. 5, the refrigerant metering rod 60 is an elongated rod having an enlarged portion 74 at one end, an intermediate portion 76 defining a flow metering geometry and a reduced diameter threaded portion 78 at the other end thereof. The configuration of the flow metering geometry 76 of the rod will be described in detail in connection with the description of the custom designing of a device 14 for a particular system. As best seen in FIG. 5 the geometry of the rod shown comprises two tapers, 75, 77 on opposing sides of the rod. The tapers 75, 77 result in an increase in the cross-sectional area of the intermediate section 76 of the rod as it progresses from the end 74 to the threaded end 78.

The enlarged end portion 74 of the rod 60 defines an annular planar surface 73 facing to the right as viewed in the drawing figures. The enlarged end 74 has a stepped down portion 79 of reduced diameter which defines an outwardly facing surface 83, perpendicular to the surface 73. The surfaces 73 and 83 together cooperate to receive and support the metering rod seal 61. The seal 61 is made from a material which will swell or otherwise seal when exposed to a refrigerant to assure retention of the seal in the described position. A neoprene o-ring has performed satisfactorily in practice.

The flow metering piston 62 is generally cylindrical in shape and has a flow metering port 80 extending axially therethrough. The flow metering port 80 is of such a size that the flow metering geometry bearing portion 76 of the rod 60 may be readily received therein to allow free relative axial movement of the flow metering piston 62 with respect to the flow metering geometry bearing section 76 of the rod 60. The space defined between the flow metering port 80 and the flow metering geometry bearing portion 76 of the rod 60 is hereinafter referred to as the flow metering passage 81. The interaction between these components will be described in detail hereinbelow in connection with the description of the custom designing of an expansion device 14 for a particular system.

The diameter of the outside surface 82 of the piston 62 is such that the piston is received within the cylindrical chamber 22 of the body 20 with a clearance allowing free axial motion of the piston with respect to the body 20. An annular groove 84 is machined into the outside surface 82 of the piston and a suitably sized O-ring 86 is adapted to be received therein in a manner such that it cooperates with the groove 84 and the inside cylindrical surface 88 of the chamber 22 to preclude refrigerant flow between those surfaces when the device is in operation in a refrigeration system.

Figure 7:
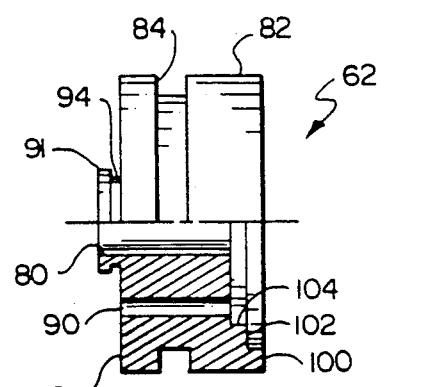
FIG. 7 is a view taken along the lines 7—7 of FIG. 6.
Figure 6:
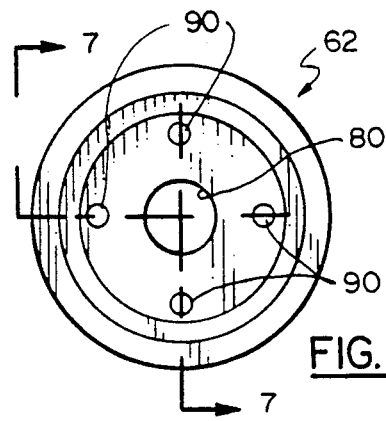
FIG. 6 is an end view of the flow metering piston of the expansion device of FIG. 1.

As best shown in FIGS. 6 and 7, the piston 62 further includes a plurality of fluid flow openings 90 extending therethrough which are parallel with the metering port 80.

As best shown in FIG. 7, a centrally located, reduced diameter boss 91 extends from the left hand facing end surface 92 of the flow metering piston 62. The boss 91 has an annular groove 94 defining an area of reduced diameter formed therein immediately adjacent the left hand facing surface 92. The groove 94 is adapted to receive and retain a washer shaped flexible seal element 66 having a central opening therethrough 98 which defines an inner diameter which allows it to be received in and retained by the groove 94. The outer diameter of the seal 66 is slightly less than the outside diameter of the piston 62. The seal 66 is intended to overlie each of the plurality of fluid flow openings 90 and to prevent refrigerant flow through these openings 90 when refrigerant is flowing through the device 14 from left to right as viewed in the drawing figures and to readily allow refrigerant flow therethrough when the flow is from right to left. In the preferred embodiment the seal 66, which is basically a check valve, is fabricated from a synthetic resin such as teflon.

With continued reference to FIG. 7, it will be seen that the right hand facing end surface 100 of the flow metering piston 62 has a pair of circular recesses formed therein. The first, larger, diameter recess 102 is sized to receive and position one end of the refrigerant metering spring 68. The second smaller recess 104 is of such a diameter that it is coextensive with the outer boundaries of the plurality of flow openings 90. This recess 104 assures that the spring 68, even if fully compressed, does not interfere with the flow of refrigerant through the device.

Assembly of the previously referred to refrigerant metering subassembly 58 is, in a preferred embodiment, carried out as follows. The metering piston O-ring 64 and the metering piston bypass seal 66 are first assembled to the metering piston 62 as previously described. The refrigerant metering rod 60 with the metering rod seal 61 installed thereon, is then inserted, threaded end 78 first, into the flow metering port 80 of the piston 62. Entry into the flow metering port is through the left hand facing end surface 92 of the piston so that when the rod 60 is pulled as far as possible through the flow metering port, the rod seal 61 is in confronting engagement with the axial end surface of the boss 91 extending from the end of the flow metering piston 62.

Figure 4:
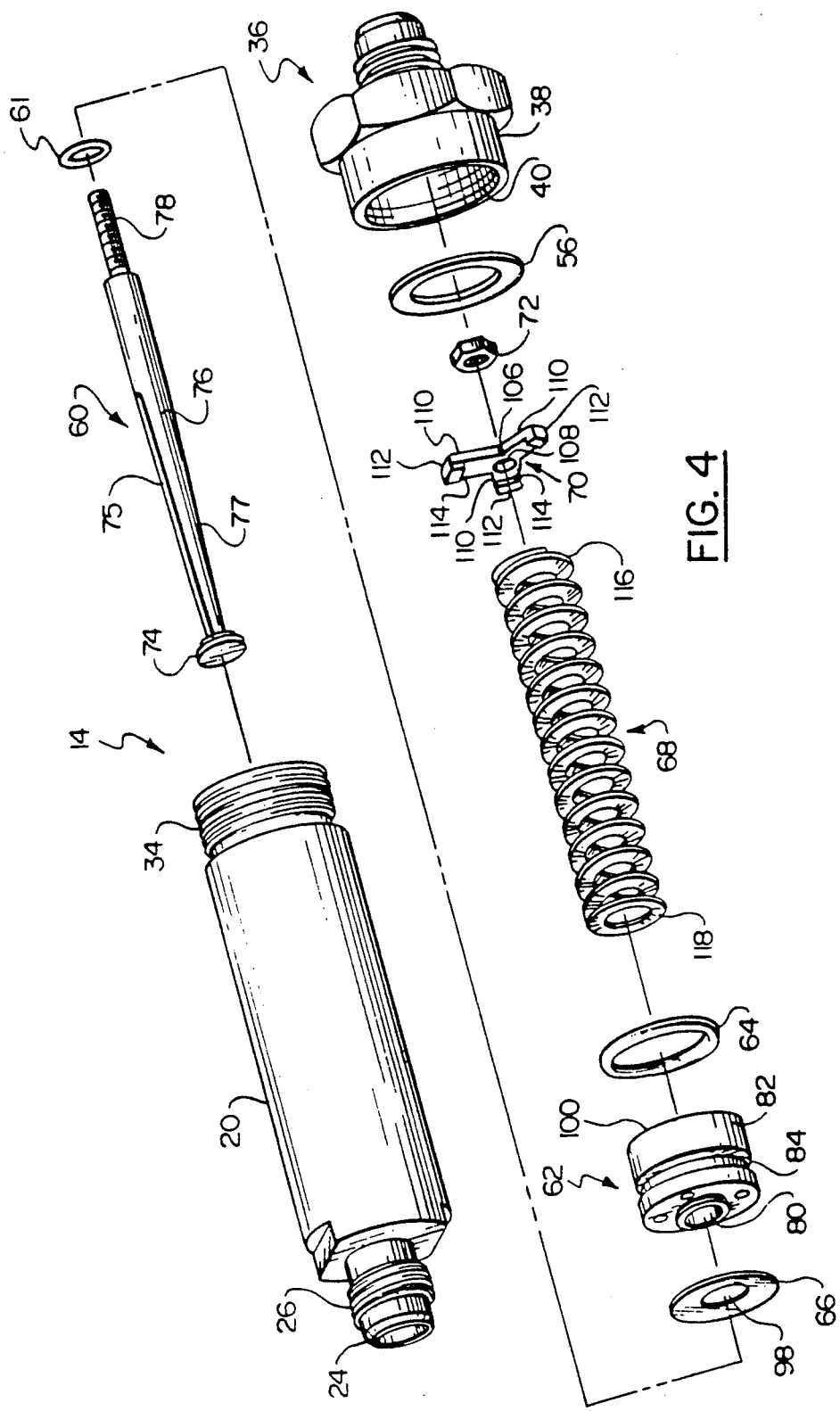
FIG. 4 is a perspective, exploded view of the expansion device of FIG. 1.

Assembly of the refrigerant metering subassembly 58 is completed by positioning the refrigerant metering spring 68 around the elongated metering rod 60 and then threading the refrigerant metering spring retainer 70 onto the reduced diameter threaded portion 78 of the rod 60. As best seen in FIG. 4, the spring retainer 70 comprises a three legged spider like element having a central portion 106 through which a threaded opening 108 extends which mates with the threads formed on the threaded end 78 of the rod 60. Extending from the central portion 106 are three legs 110, each terminating in an arcuately shaped end 112 of increased thickness. The inwardly facing arcuate surfaces 114 defined by the three arcuate ends 112 are sized such that they cooperate to engage the outer perimeter of one end 116 of the spring 68 thereby serving to support and center the spring with respect to the rod 60. In a like manner, the recess 102 formed in the right hand facing end 100 of the piston 62 engages the other end 118 of the spring 68. The assembly of the refrigerant metering subassembly is completed by threading the hexagonal metering assembly lock nut 72 onto the threaded end portion 78 of the metering rod 60.

As thus assembled, the refrigerant metering spring 68 is held between the spring retainer 70 and the right hand face 100 of the metering piston 62. This arrangement allows the refrigerant metering subassembly to be calibrated to provide a predetermined compressive force on the spring 68 to set the device for proper operation in a particular system. The advantage of this capability will be appreciated following the description of the operation of the device in an actual system. For purposes of completing the refrigerant metering subassembly 58, it will be appreciated that the spring retainer 70 will be threaded onto the rod 60 to the desired position for a given application. The amount of preload obtained by compressing the spring a given distance may be calculated in a simple manner and will be discussed in connection with the overall system design and operation. Following threading of the retainer to its desired location, the retainer is held at that position and the lock nut 72 is tightened against the retainer 70 to lock it at that position.

Figure 3:
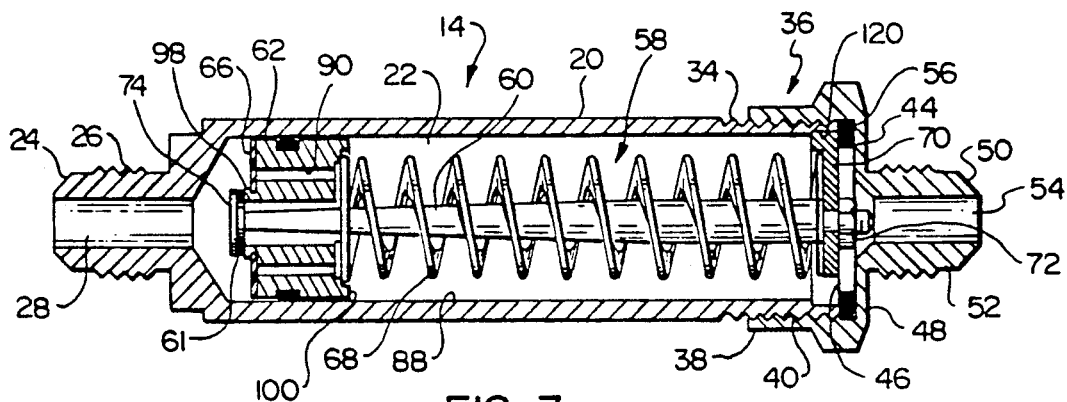
FIG. 3 is a longitudinal sectional view through the expansion device of FIG. 2.
Figure 11:
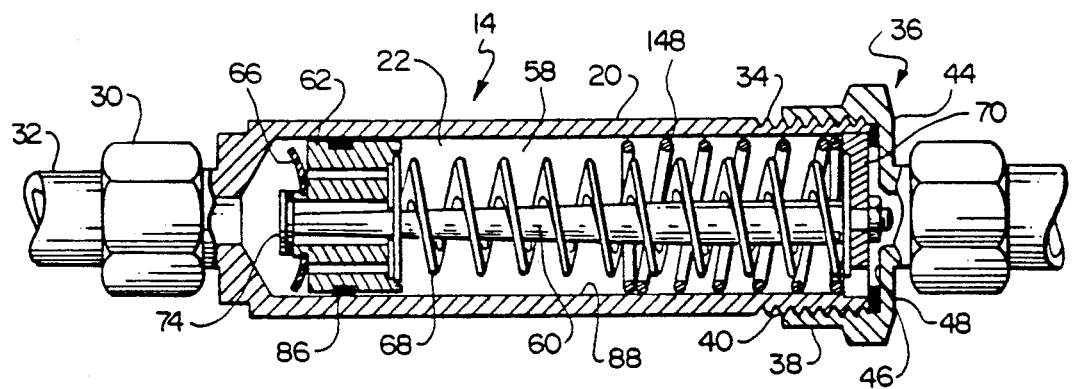
FIG. 11 is a longitudinal sectional view of the expansion device of FIG. 1 shown in the heating or bypass mode of operation.

Assembly of the expansion device 14 is completed by insertion of the refrigerant metering subassembly 58, piston end first, into the cylindrical chamber 22 of the body 20. As shown in FIGS. 3, 8 and 11, the open end of the right hand end of the body 20 has formed in the interior thereof, a circumferential shoulder 120 which is configured to receive the enlarged arcuate ends 112 of the legs 110 of the refrigerant spring retainer 70. The ends 112 are received in the shoulder 120 in a relatively close tolerance fit so that when the end cap 36 is threadably engaged with the threads 34 on the body 20, the shoulder 120, the end cap 36, and the circular washer 56 contained within the end cap, cooperate to rigidly affix the refrigerant metering subassembly 58 within the housing 20 and also to establish the desired fluid tight seal between the body 20 and the end cap 36.

As previously discussed in connection with FIG. 1, an assembled expansion device 14 is installed in a refrigeration system to receive liquid refrigerant at a high pressure through the high side refrigerant line 18 and serves to regulate the flow of refrigerant therethrough to deliver refrigerant to the evaporator 16 through the low side refrigerant line 19 at optimum conditions. Referring now to FIG. 3, the expansion device 14 is shown in a static—no flow condition. As shown, the refrigerant metering subassembly 58, prior to assembly, has been adjusted so that it urges or biases the piston 62 to the left, so that the boss 91 extending from the left hand facing surface 92 of the piston engages the metering rod seal 61 which biases the seal into contact with the annular surface 75 of the enlarged end 74. The above described structure serves two purposes, first, the engagement of the boss 91 with the seal 61, and, the seal, in turn, with the surface 73 serves to limit the movement of the piston 62 to the left, as viewed in the drawings. Secondly, the engagement of these components serves to prevent the flow of refrigerant to the pistons flow metering port 80 when the piston 62 is biased into sealing contact with the seal 61.

As a result of the above described positive shut-off feature, the expansion device 14 is capable of preventing refrigerant migration from the high pressure side to the low pressure side when the system in which it is installed is shut off. The shut-off capability also allows the system to maintain a pressure differential between the high and low side when the system is shut off. A direct benefit of these features is that the degradation coefficient $C_D$ of the refrigerant system is reduced. Degradation coefficient is a term defined by the U.S. Department of Energy which relates to the measure of the efficiency loss of a system due to the cycling of the system.

The magnitude of the pressure differential which the device 14 can maintain may be set by preloading the refrigerant metering subassembly 58, as discussed hereinabove, to a system threshold pressure differential. Once set, this pressure differential must be reached in the system before the expansion device 14 will begin to allow the flow of refrigerant therethrough. It follows from the above, that, when the system is in operation and the system pressure differential falls to or below the threshold pressure, the device will become closed to refrigerant flow and will maintain the threshold pressure differential. A good compromise system pressure threshold for such a device in use in a split system air conditioning system is 30 psi. A 30 psi pressure differential is a good compromise number in that it prevents refrigerant migration, lowers system $C_D$, and is low enough that most compressors can start against this pressure without start assist. If start assist is used, the pressure differential may be increased.

Figure 9:
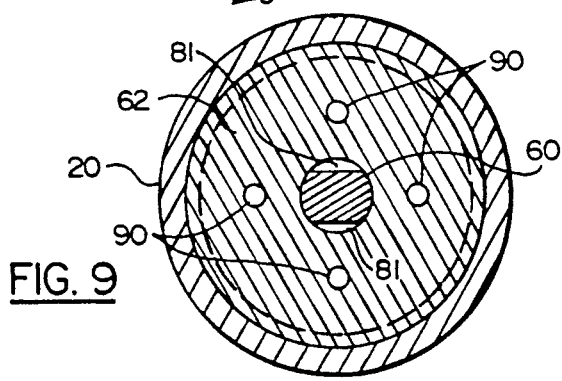
FIG. 9 is a sectional view through the expansion device of FIG. 8 taken along the line 9—9 of FIG. 8.

The operation of the refrigerant metering device 14 is very simple. When the refrigeration system is started up, the pressure differential between the high and the low sides begins to develop, when the pressure differential exceeds the threshold pressure differential for the system, the piston 62 begins to move to the right and the flow of refrigerant begins to pass through the flow metering passage 81 between the intermediate portion 76 of the flow metering rod 60 and the flow metering port 80 in the flow metering piston 62. Because the size of the flow metering port 80 is fixed, the cross-sectional area of the flow metering passage 81 is determined by the cross-sectional area of the rod 60 at any particular point along its length. FIGS. 8 and 9 illustrate the expansion device 14 as it would appear in operation with an intermediate pressure drop, e.g., about 150 psi, across the piston. The flow metering passage 81, it will be noted is made up of two discreet segments, each bearing the reference numeral 81, on opposite sides of the rod. These segments 81 are defined by the two tapers 75, 77 previously referred to hereinabove.

As a general rule, it has been found that the cross-sectional area of the rod 60 should progress from a smaller value adjacent the enlarged end 74 to a larger cross-sectional area as you approach the other end of the rod. The relationship thus established is that the flow metering passage 81 defined by the port 80 and the rod 60 is larger at low pressure differentials and decreases as the pressure differential across the piston 60 increases.

When the expansion device 14 is in operation in a system, the position of the piston along the length of the rod may be determined by analyzing the forces acting on the opposite sides of the piston 60. The following equation sets forth these forces: $F = \Delta PA = Kx$. In the foregoing equation, the variables and constants used are defined as follows:

$\Delta P$ = condensing pressure (high side) − evaporating pressure (low side)

$A$ = the area of the piston

K = the spring rate
x = piston travel

The dimension x is measured from the planar surface 73 of the enlarged end portion 74 of the rod 60 as shown in FIG. 5.

Using the above equation, along with well-known refrigeration design techniques, a design engineer is able to design an expansion device which is capable of controlling the flow of refrigerant in a refrigeration system at optimum conditions over a wide range of operating conditions. The object of the design is to provide an optimum expansion area for a variety of different indoor and outdoor temperature and humidity conditions. This is achieved by changing the cross-sectional area of the rod by machining or forming a flow metering geometry thereon. This geometry may include tapers, flats or any other desired geometry which provides the desired cross-section at a particular location. Since it is not practical to machine a large number of tapers onto the rod, typically two to four are used. If more tapers are desired, the part could be molded from a suitable moldable material. To determine the configuration of the tapers, for a given system, the force balance equation is solved for several sets of operating conditions.

The most important conditions are those set by the United States Department of Energy and commonly referred to in the industry as DOE "A", DOE "B", etc. As an example, the operating conditions for ratings and performance tests required by DOE "A" set forth the following conditions: the temperature of air entering the indoor coil is 80° F./67° F. where the first temperature is the dry bulb temperature and the second is the wet bulb temperature; the temperature of outside air entering the condenser is 95° F.

Given these test conditions, an optimum expansion orifice cross-sectional area and corresponding pressure differential between the high and low side of a given system may be readily determined using well known design techniques. With this information available, the only unknown in the above equation is x, i.e., the location of the piston along the length of the rod. Solving the equation for x tells the designer that the cross-sectional area of the rod, at that point along the rod (at x), and the cross-sectional area of the flow metering port 80 in the piston 62 must cooperate to define a flow metering passage 81 cross-section which equals the previously determined optimum expansion area for the previously determined pressure differential.

Following these steps for a number of other operating conditions provides the designer with a number of optimum expansion areas at different locations along the rod. With this information, the size of the flow metering port 80 in the piston 62 and the geometry of the flow metering rod 60 may be selected such that the flow metering passageway 81 defined in the space between these two elements provides the desired optimum expansion area for given pressure differentials at corresponding positions along the rod.

For purposes of the above design discussion, it was pointed out that the dimension x was measured from the planar surface 73 of the enlarged end portion 74 of the rod 60. In the illustrated embodiment, once the above analysis has been carried out for a number of conditions and a flow metering geometry is determined, the positioning of the flow metering geometry on the rod must be adjusted to account for the length of the piston 60 and any preload to the spring 68 in a particular system.

Referring now to FIG. 8, it will be seen that the cross-sectional area of the flow metering passage 81 varies from a maximum value at the left hand end of the piston to a minimum value at the right hand end of the piston. It is the cross-sectional area at the right hand end of the piston, i.e., the minimum area which actually defines the effective flow metering passage 81 for any given position of the piston 62. The positions of the piston 62 on the rod 60 obtained by use of the force balance equation are actually the positions at the left hand end of the piston. Thus, in order to properly position the tapers on the rod, the thickness of the piston must be added to each of the x dimensions determined by the designer.

Finally, in order to adjust for any preload, the x values just adjusted for piston thickness must be reduced by a distance corresponding to the preload of the refrigerant metering subassembly 58. This adjustment is arrived at by solving the force balance equation for x using the preload pressure as the pressure differential.

Figure 10:
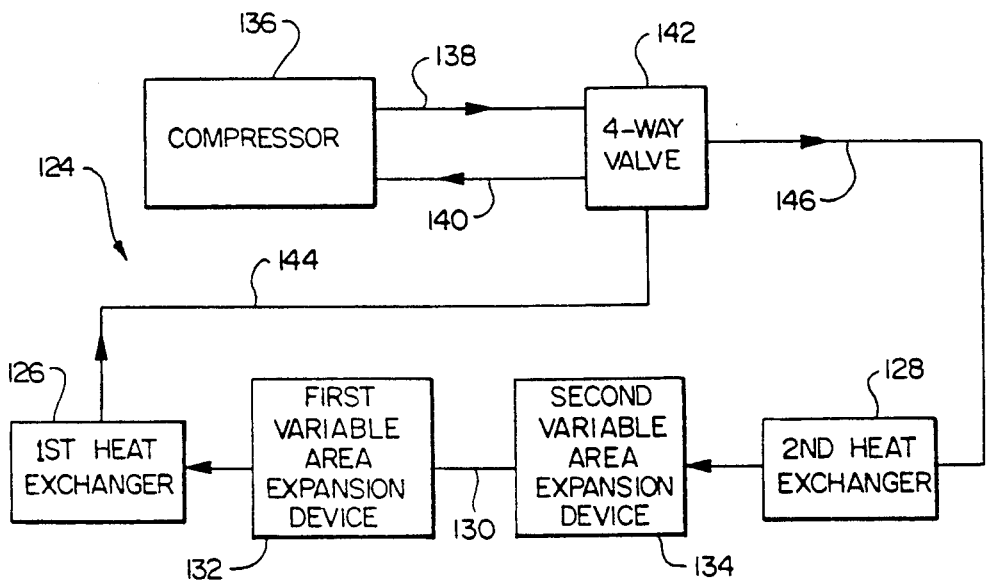
FIG. 10 is a diagrammatic representation of a heat pump system capable of being thermodynamically reversed to provide either heating or cooling, the system containing two of the expansion devices of the present invention.

The expansion device 14 has thus far been described in connection with use in a compression refrigeration system. With reference now to FIGS. 10 and 11, it will be seen that a pair of such expansion devices 14 may be used in a reversible refrigeration system or heat pump adapted for providing either heating or cooling. The heat pump system 124 includes a first heat exchanger 126 and a second heat exchanger 128. The two heat exchangers are operatively connected to one another by a supply line 130 which contains two expansion devices 132 and 134 embodying the teachings of the present invention. The two expansion devices are mounted in opposing relationship to one another in the supply line 130. As a result, one device is adapted to meter refrigerant flowing through the supply line in one direction while the other device is arranged to meter refrigerant flowing through the supply line in the other direction. In either case, the metering device which is not serving to meter refrigerant during operation of the system, operates to allow substantially unrestricted flow of refrigerant therethrough through the plurality of fluid flow openings 90.

FIG. 11 illustrates an expansion device 14 in bypass operation wherein refrigerant is flowing from right to left as viewed in the drawing figure. It will be seen that the refrigerant flowing through the passages 90 causes the flexible seal element 96 to lift from the face of the piston to allow the desired unrestricted flow. In order to assure that the flow is unrestricted, the cross-sectional area of the plurality of passageways 90 is designed to equal or exceed the inside cross-sectional area of the supply line 130 in which the devices are connected.

With continued reference to FIG. 10, the heat pump system includes a compressor 136 which is arranged so that the discharge piping 138 and the inlet piping 140 thereof are operatively associated with a four-way valve 142. The four-way valve, in turn, is operatively connected to the two heat exchangers 126, 128 by refrigerant lines 144, 146, respectively. By selectively positioning the four-way valve, the connection to the discharge side and suction side of the compressor may be reversed between the heat exchangers. In a cooling mode of operation, the suction line 140 of the compressor is connected to heat exchanger 126 via line 144 and the discharge line 138 is connected to the heat exchanger 128 via line 146. As a result, heat exchanger 128 functions as a conventional condenser within the cycle, while heat exchanger 126 performs the duty of an evaporator. In the cooling mode, the refrigerant passing through the supply line 130 is metered in a controlled manner according to the present invention from the high pressure condenser 128 into the low pressure evaporator 126 via the first variable area expansion device 132. During such operation, the second variably area expansion device 134, which is mounted in the supply line 130, as illustrated in FIG. 11, allows free, unrestricted flow therethrough.

When the system 124 is operated in the heating mode, the setting of the four way valve is reversed. Thus, changing the direction of refrigerant flow, and the function of the two heat exchangers is reversed. In such operation, the second variable area expansion device 134 serves to meter the flow of refrigerant to the second heat exchanger 128 in a controlled fashion.

It should be appreciated that the configurations of the tapers on the metering rods of the two expansion devices 132, 134 will be different from one another in that the conditions of operation of the system during the cooling mode and the heating mode are substantially different. Each expansion device is designed to deliver the optimum amount of refrigerant flow for the full range of operating conditions which the system is expected to experience.

Referring now to FIG. 11, it will be seen that a second spring 148, which is shorter in length and larger in diameter than the spring 68 is mounted in coaxial surrounding relationship with the spring 68 within the housing 22. As the piston 62 moves to the right under conditions of extremely high pressure differentials across the piston, the right hand facing end of the piston will engage the second spring 148. This will increase the spring rate, K, of the system. If such second spring is deemed necessary, the design of the geometry of the rod is the same as described hereinabove, except that, beyond certain values of x, the combined spring rate of the two springs must be used.

Accordingly, it should be appreciated, that a refrigerant expansion device has been provided wherein the cross-sectional area of the flow metering passage therein is controlled to an optimum size for an extremely wide range of operating conditions of the system.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A fluid flow metering device comprising:
   a housing having a flow passage extending therethrough said housing including an inlet at one end of said flow passage and an outlet at the other end thereof;
   a piston having a flow metering port extending therethrough, said piston being movably disposed within said flow passage;
   an elongated member extending through said metering port, said member and sad port cooperating to define a flow metering passage therebetween, the cross-sectional area of said member increasing for at least a portion of its length in going from said inlet to said outlet to vary the cross-sectional area of said flow metering passage in relation to the position of said member to said port;
   means for supporting said member within said housing in alignment with said port;
   stop means for limiting movement of said piston in one direction said stop means comprising an enlarged portion at the end of said elongated member nearest said inlet, said enlarged portion being configured to engage a portion of the end of said piston which faces said inlet; and
   means for biasing said piston towards said stop and for allowing movement of said piston away from said stop as a function of the differential pressure across said piston, wherein said means for biasing may be adjusted so that a predetermined differential pressure across said piston must be reached before said piston moves away from said stop means.

2. A fluid flow metering device comprising:
   a housing having a flow passage extending therethrough said housing including an inlet at one end of said flow passage and an outlet at the other end thereof;
   a piston having a flow metering port extending therethrough, said piston being movably disposed within said flow passage;
   an elongated member extending through said metering port, said member and said port cooperating to define a flow metering passage therebetween, the cross-sectional area of said member increasing for at least a portion of its length in going from said inlet to said outlet to vary the cross-sectional area of said flow metering passage in relation to the position of said member to said port;
   means for supporting said member within said housing in alignment with said port;
   stop means for limiting movement of said piston in one direction said stop means comprising an enlarged portion at the end of said elongated member nearest said inlet, said enlarged portion being configured to engage a portion of the end of said piston which faces said inlet, wherein said enlarged portion of said elongated member and said portion of the end of said piston which is engages are configured to cooperate with one another to prevent the flow of fluid to said metering port when said means for biasing causes said piston to engage said enlarged portion; and
   means for biasing said piston towards said stop and for allowing movement of said piston away from said stop as a function of the differential pressure across said piston, wherein said means for biasing may be adjusted so that a predetermined differential pressure across said piston must be reached before said piston moves away from said enlarged portion of said elongated member, thereby allowing flow of fluid to said metering port.

3. A fluid flow metering device comprising:
   a housing having a flow passage extending therethrough said housing including an inlet at one end of said flow passage and an outlet at the other end thereof;
   a piston having a flow metering port extending therethrough, said piston being movably disposed within said flow passage;
   an elongated member extending through said metering port, said member and said port cooperating to define a flow metering passage therebetween, the cross-sectional area of said member increasing for at least a portion of its length in going from said inlet to said outlet to vary the cross-sectional area of said flow metering passage in relation to the position of said member to said port;

means for supporting said member within said housing in alignment with said port;

stop means for limiting movement of said piston in one direction said stop means comprising an enlarged portion at the end of said elongated member nearest said inlet, said enlarged portion being configured to engage a portion of the end of said piston which faces said inlet; and means for biasing said piston towards said stop and for allowing movement of said piston away from said stop as a function of the differential pressure across said piston, said means for biasing comprising a coil spring surrounding said elongated member, one end of said spring engaging said piston and the other end thereof being supported by a structural element attached to said housing.

4. A fluid flow metering device comprising:

a housing having a flow passage extending therethrough said housing including an inlet at one end of said flow passage and an outlet at the other end thereof;

a piston having a flow metering port extending therethrough, said piston being movably disposed within said flow passage;

an elongated member extending through said metering port, said member and said port cooperating to define a flow metering passage therebetween, the cross-sectional area of said member increasing for at least a portion of its length in going from said inlet to said outlet to vary the cross-sectional area of said flow metering passage in relation to the position of said member to said port;

means for supporting said member within said housing in alignment with said port;

stop means for limiting movement of said piston in one direction said stop means comprising an enlarged portion at the end of said elongated member nearest said inlet, said enlarged portion being configured to engage a portion of the end of said piston which faces an inlet; and means for biasing said piston towards said stop and for allowing movement of said piston away from said stop as a function of the differential pressure across said piston, said means for biasing comprising a coil spring surrounding said elongated member, one end of said spring engaging the face of said piston which faces said outlet, and, the other end of said spring engaging a stop adjacent said outlet.

5. A fluid flow metering device comprising:

a housing having a flow passage extending therethrough;

a piston having a flow metering port extending therethrough, said piston being movably disposed within said flow passage;

an elongated member extending into said metering port, said member and said port cooperating to define a flow metering passage therebetween, said member being configured to vary the cross-sectional area of said flow metering passage in relation to the position of said member to said port;

means for supporting said member within said housing in alignment with said port;

stop means for limiting movement of said piston in one direction;

means for biasing said piston towards said stop and for allowing movement of said piston away from said stop as a function of the differential pressure across said piston;

wherein said device operates to meter the flow of fluid therethrough when fluid is flowing in the direction opposite to said one direction, and, further including, bypass flow means for allowing substantially unrestricted flow of fluid through said device in said one direction.

6. The apparatus of claim 5, wherein said bypass flow means comprises a bypass flow passage extending through said piston, and, a check valve, said check valve preventing flow through said bypass flow passage when refrigerant is flowing in said opposite direction and allowing substantially unrestricted flow through said bypass flow passage when refrigerant is flowing said one direction.

7. The apparatus of claim 6, wherein said bypass flow passage comprises a plurality of through openings which are parallel to said flow metering port.

8. The apparatus of claim 7, wherein said check valve comprises a planar seal element carried by the end of said piston which faces in said one direction, said seal element being configured to overlay said plurality of openings in said piston and to prevent flow of fluid to said openings when fluid is flowing through said device in said opposite direction.

9. A fluid flow metering device comprising:

a housing having a flow passage extending therethrough said housing including an inlet at one end of said flow passage and an outlet at the other end thereof;

a piston having a flow metering port extending therethrough, said piston being movably disposed within said flow passage;

an elongated member extending through said metering port, said member and said port cooperating to define a flow metering passage therebetween, the cross-sectional area of said member increasing for at least a portion of its length in going from said inlet to said outlet to vary the cross-sectional area of said flow metering passage in relation to the position of said member to said port;

means for supporting said member within said housing in alignment with said port;

stop means for limiting movement of said piston in one direction said stop means comprising an enlarged portion at the end of said elongated member nearest said inlet, said enlarged portion being configured to engage a portion of the end of said piston which faces said inlet; and means for biasing said piston towards said stop and for allowing movement of said piston away from said stop as a function of the differential pressure across said piston, said means for biasing comprising a plurality of coil springs.

10. An expansion device for metering the flow of refrigerant therethrough comprising:

a body having a flow passage therethrough for passing a flow of refrigerant, said flow passage including a refrigerant inlet opening at one end thereof and a refrigerant outlet opening at the other end thereof, said flow passage further including a chamber formed in said body in fluid communication with said inlet and outlet openings;

an elongated rod axially disposed within said chamber, said rod having one end positioned adjacent said inlet opening and the other end positioned adjacent said outlet opening, said rod having a flow metering geometry formed thereon;

means for supporting said rod within said chamber;

a piston having a flow metering port passing therethrough, said piston being slideably mounted within said chamber with said elongated rod extending through said metering port, said piston being moveable from a first position adjacent said one end of said rod to a second position closer to said other end of said rod, said metering port and said flow metering geometry of said rod cooperating to define a flow metering passage therebetween;

means for preventing said piston from moving beyond said first position in the direction of said inlet opening said means comprising an enlarged portion formed at said one end of said rod which is at least in part larger than the diameter of said metering port of said flow metering piston, said enlarged portion being in operative contact with a portion of the end of said piston which faces said inlet opening, and, wherein said enlarged portion of said rod and said portion of the end of said piston are configured to cooperate with one another to prevent the flow of refrigerant to said metering port when said means for biasing causes said piston to engage said enlarged portion; and means for biasing said piston toward said means for preventing, and, for allowing movement of said piston, against the force of said means for biasing, in the direction of said second position in response to the differential pressure across said piston, and, wherein said means for biasing may be adjusted so that a predetermined differential pressure, across said piston, must be reached before said piston moves out of engagement with said enlarged portion of said rod, thereby allowing flow of fluid to said metering port.

11. An expansion device for metering the flow of refrigerant therethrough in one direction and allowing substantially unrestricted flow of refrigerant in the opposite direction which comprises:

a body having a flow passage therethrough for passing a flow of refrigerant in either direction;

an elongated rod axially disposed within said flow passage, said rod having a flow metering geometry formed thereon;

means for supporting said rod within said flow passage;

a piston having a flow metering port passing therethrough, said piston being slideably mounted within said flow passage with said elongated rod extending through said metering port, said piston being moveable with respect to said rod between a first position adjacent one end of said rod and a second position closer to the other end of said rod, said metering port and said rod cooperating to define a flow metering passage therebetween;

means for controlling the position of said piston along said rod between said first position and said second position in response to the differential pressure of the refrigerant across said piston when refrigerant is flowing therethrough in one direction, said one direction being the direction going from said one end of said rod to said other end thereof; and wherein said piston further includes a bypass flow means for allowing substantially unrestricted flow of refrigerant through said device in said opposite direction.

12. The apparatus of claim 11, wherein said bypass flow means comprises a bypass flow passage extending through said piston, and, a check valve, said check valve preventing flow through said bypass flow passage when refrigerant is flowing in said one direction and allowing free flow through said bypass flow passage when refrigerant is flowing in said opposite direction.

13. The apparatus of claim 12, wherein said bypass flow passage comprises a plurality of through openings which are parallel to said flow metering port.

14. The apparatus of claim 11, wherein said flow metering geometry of said elongated rod comprises a cross-sectional area that increases, for at least a portion of its length in going from said one end of said rod to said other end thereof.

15. A refrigerant system including a compressor, a condenser, an evaporator, and a flow metering device disposed between said condenser and said evaporator, which are connected together in series for circulating a refrigerant therethrough, said compressor and said flow metering device defining therebetween a high pressure side and a low pressure side of said system, said flow metering device comprising:

a housing having a flow passage extending therethrough, said flow passage providing a flow path for refrigerant passing from said condenser to said evaporator through said flow metering device;

a piston having a flow metering port extending therethrough, said piston being movably disposed within said flow passage;

an elongated member extending through said metering port, said member and said port cooperating to define a flow metering passage therebetween, said member being configured to vary the cross-sectional area of said flow metering passage in relation to the position of said member to said port;

means for supporting said elongated member within said housing in alignment with said port;

stop means for limiting movement of said piston in one direction said stop means comprising an enlarged portion at the end of said elongated member nearest said condenser, said enlarged portion being configured to engage a portion of the end of said piston which is nearest said condenser; and means for biasing said piston towards said stop and for allowing movement of said piston away from said stop as a function of the differential pressure across said piston.

16. The apparatus of claim 15, wherein the cross-sectional area of said elongated member is varied along at least a portion of its length.

17. The apparatus of claim 16, wherein said cross-sectional area of said elongated member increases for at least a portion of its length in going from said metering devices connection to said condenser to its connection to said evaporator.

18. The apparatus of claim 15, wherein said enlarged portion of said elongated member and said portion of the end of said piston which it engages are configured to cooperate with one another to prevent the flow of refrigerant to said metering port when said means for biasing causes said piston to engage said enlarged portion.

19. The apparatus of claim 18, wherein said means for biasing may be adjusted so that a predetermined differential pressure across said piston must be reached before said piston moves away from said enlarged portion of said elongated member, thereby allowing flow of fluid to said metering port.

20. The apparatus of claim 18, wherein said means for biasing comprises a coil spring.

21. The apparatus of claim 20, wherein said coil springs surrounds said elongated member, one end of said spring engaging said piston and the other end thereof being supported by a structural element attached to said housing.

22. In a heat pump system having a compressor, a first heat exchanger and a second heat exchanger, a refrigerant supply line interconnecting with two heat exchangers, two expansion devices serially mounted in the supply line in opposed relationship each expansion device being capable of metering the flow of refrigerant therethrough in one direction and allowing substantially unrestricted flow of refrigerant in the opposite direction, and, a switching means for selectively connecting the inlet and discharge side of the compressor between the heat exchangers, wherein the improvement comprises:

each of the expansion devices including a body having a flow passage therethrough for passing a flow of refrigerant in either direction;

an elongated rod axially disposed within said flow passage, said rod having a flow metering geometry formed thereon;

means for supporting said rod within said flow passage;

a piston having a flow metering port passing therethrough, said piston being slideably mounted within said flow passage with said elongated rod extending through said metering port, said piston being movable with respect to said rod between a first position adjacent one end of said rod and a second position closer to the other end of said rod, said metering port and said rod cooperating to define a flow metering passage therebetween;

means for controlling the position of said piston along said rod between said first position and said second position in response to the differential pressure of the refrigerant across said piston when refrigerant is flowing therethrough in said one direction, said one direction being the direction going from said one end of said rod to said other end thereof;

said elongated rod further including stop means at said one end thereof, said stop comprising an enlarged portion configured to engage a portion of the end of said piston adjacent thereto; and said piston further including a bypass flow means for allowing substantially unrestricted flow of a refrigerant through said device in said opposite direction.

23. The apparatus of claim 22, wherein said flow metering geometry of said elongated rod comprises a cross-sectional area that increases, for at least a portion of its length, in going from said one end of said rod to said other end thereof.

* * * * *